US007603442B2

(12) United States Patent
Sen

(10) Patent No.: US 7,603,442 B2
(45) Date of Patent: Oct. 13, 2009

(54) METHOD AND SYSTEM FOR MAINTAINING SERVICE DEPENDENCY RELATIONSHIPS IN A COMPUTER SYSTEM

(75) Inventor: Ranjan K. Sen, North Bethesda, MD (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 10/600,394

(22) Filed: Jun. 20, 2003

(65) Prior Publication Data

US 2004/0261079 A1    Dec. 23, 2004

(51) Int. Cl.
*G06F 15/177* (2006.01)
(52) U.S. Cl. .................... 709/220; 709/224; 370/254
(58) Field of Classification Search ............... None
See application file for complete search history.

(56) References Cited

U.S. PATENT DOCUMENTS

| | | | |
|---|---|---|---|
| 4,718,008 A | | 1/1988 | Chang et al. |
| 4,730,249 A | | 3/1988 | O'Quin, II et al. |
| 4,742,447 A | | 5/1988 | Duvall et al. |
| 5,202,985 A | * | 4/1993 | Goyal .................. 709/224 |
| 5,414,812 A | | 5/1995 | Filip et al. |
| 5,463,775 A | | 10/1995 | DeWitt et al. |
| 5,485,409 A | | 1/1996 | Gupta et al. |
| 5,491,819 A | | 2/1996 | Fatzinger et al. |
| 5,572,672 A | | 11/1996 | Dewitt et al. |
| 5,596,723 A | * | 1/1997 | Romohr .................. 709/222 |
| 5,638,539 A | | 6/1997 | Goti |
| 5,713,027 A | * | 1/1998 | Soejima et al. ......... 709/224 |
| 5,748,980 A | | 5/1998 | Lipe et al. |
| 5,819,033 A | * | 10/1998 | Caccavale .............. 709/224 |
| 5,870,763 A | | 2/1999 | Lomet |
| 5,875,330 A | | 2/1999 | Goti |
| 5,933,838 A | | 8/1999 | Lomet |
| 5,946,698 A | | 8/1999 | Lomet |
| RE36,462 E | | 12/1999 | Chang et al. |
| 6,038,538 A | | 3/2000 | Agrawal et al. |
| 6,049,798 A | | 4/2000 | Bishop et al. |
| 6,067,550 A | | 5/2000 | Lomet |
| 6,076,105 A | * | 6/2000 | Wolff et al. ............ 709/223 |
| 6,151,607 A | | 11/2000 | Lomet |
| 6,163,855 A | | 12/2000 | Shrivastava et al. |

(Continued)

OTHER PUBLICATIONS

Undercoffer, Jeffrey et al. "A Secure Infrastructure for Service Discovery and Access in Pervasive Computing." Mobile Networks and Applications. vol. 8, Issue 2. pp. 113-125. Apr. 2003. Kluwer Academic Publishers.*

(Continued)

*Primary Examiner*—Vivek Srivastava
*Assistant Examiner*—Jeffrey R Swearingen
(74) *Attorney, Agent, or Firm*—Marshall Gerstein & Borun LLP

(57) ABSTRACT

A method and computer system for maintaining service dependency relationships in a computer system is disclosed, which periodically checks the status of the service components in the system and maintains the service dependency by starting any lost service components when needed. A reference file that includes the dependency links between the installed service components in the system is used to compare against a dynamic service consistency file that includes the dependency links between the currently available service components. From the comparison, the computer system is able to activate any lost service components. As a result, the service dependency of the computer system is maintained.

13 Claims, 9 Drawing Sheets

U.S. PATENT DOCUMENTS

| | | | |
|---|---|---|---|
| 6,167,446 A * | 12/2000 | Lister et al. | 709/223 |
| 6,178,529 B1 | 1/2001 | Short et al. | |
| 6,182,086 B1 | 1/2001 | Lomet et al. | |
| 6,216,212 B1 | 4/2001 | Challenger et al. | |
| 6,243,825 B1 | 6/2001 | Gamache et al. | |
| 6,256,712 B1 | 7/2001 | Challenger et al. | |
| 6,360,331 B2 | 3/2002 | Vert et al. | |
| 6,401,120 B1 | 6/2002 | Gamache et al. | |
| 6,449,734 B1 | 9/2002 | Shrivastava et al. | |
| 6,453,426 B1 | 9/2002 | Gamache et al. | |
| 6,490,594 B1 | 12/2002 | Lomet | |
| 6,507,875 B1 | 1/2003 | Mellen-Garnett et al. | |
| 6,654,801 B2 * | 11/2003 | Mann et al. | 709/224 |
| 6,718,376 B1 * | 4/2004 | Chu et al. | 709/223 |
| 7,349,961 B2 * | 3/2008 | Yamamoto | 709/224 |
| 7,499,986 B2 * | 3/2009 | Axberg et al. | 709/221 |
| 2002/0059425 A1 | 5/2002 | Belfiore et al. | |

OTHER PUBLICATIONS

Hodes, Todd et al. "An Architecture for Secure Wide-Area Service Discovery." Wireless Networks. vol. 8, issue 2/3. Mar. 2002. pp. 213-230. Kluwer Academic Publishers.*

Ko, In-Young et al. "Dynamic Coordination of Information Management Services for Processing Dynamic Web Content." Proceedings of the 11th international conference on World Wide Web WWW'02. ACM Press. May 2002. 355-65.*

* cited by examiner

| Host process(es) | Provider Service(s) |
|---|---|
| services.exe | Eventlog, PlugPlay |
| lsass.exe | Netlogon, PolicyAgent, ProtectedStorage, SamSs |
| Svchost1.exe | RpcSs |
| Svchost2.exe | AudioSrv, BITS, CryptSvc, Dhcp, dmserver, ERSvc, EventSystem, helpsvc, Irmon, lanmanserver, lanmanworkstation, Messenger, Netman, Nla, NWCWorkstation, RasMan, Schedule, seclogon, SENS, SharedAccess, ShellHWDetection, srservice, TapiSrv, TermService, Themes, TrkWks, uploadmgr, W32Time, winmgmt, WmdmPmSp, wuauserv, WZCSVC |
| Svchost3.exe | Dnscache |
| Svchost4.exe | LmHosts, RemoteRegistry, SSDPSRV, WebClient |
| spoolsv.exe | Spooler |
| alg.exe | ALG |
| inetinfo.exe | IISADMIN, SMTPSVC, W3SVC |
| InoRpc.exe | InoRPC |
| InoRT.exe | InoRT |
| InoTask.exe | InoTask |
| mdm.exe | MDM |
| mnmsrvc.exe | mnmsrvc |
| scardsvr.exe | SCardSvr |

| Service name | Depends On | Provider Service host process |
|---|---|---|
| Eventlog | - | |
| PlugPlay | - | 302 |
| Netlogon | lanmanworkstation | svchost2 |
| PolicyAgent | rpcss | svchost1 |
| ProtectedStorage | rpcss | svchost1 |
| SamSs | rpcss | svchost1 |
| RpcSs | | |
| AudioSrv | rpcss, eventlog | svchost1, services |
| BITS | rpcss,lanmanworkstation | svchost1,svchost2 |
| CryptSvc | rpcss | svchost1 |
| Dhcp | - | |
| Dmserver | rpcss, eventlog | svchost1, services |
| ERSvc | rpcss | svchost1 |
| EventSystem | rpcss | svchost1 |
| Helpsvc | rpcss | svchost1 |
| Irmon, | rpcss, termservice | svchost1,svchost2 |
| Lanmanserver | | |
| Lanmanworkstation | | |
| Messenger | rpcss, plugplay | svchost1, services |
| Netman | rpcss | svchost1 |
| Nla | - | |
| NWCWorkstation | | |
| RasMan | tapisrv | svchost2 |
| Schedule | rpcss | svchost1 |
| Seclogon | | |
| SENS | eventsystem | services |
| SharedAccess | rasman,netman,alg | alg,svchost2 |
| ShellHWDetection | rpcss | svchost1 |
| Srservice | rpcss | svchost1 |
| TapiSrv | rpcss, plugplay | svchost1, services |
| TermService | rpcss | svchost1 |
| Themes | - | |
| TrkWks | rpcss | svchost1 |
| Uploadmgr | rpcss | svchost1 |
| W32Time | - | |
| Winmgmt | rpcss, eventlog | svchost1, services |
| WmdmPmSp | - | |
| Wuauserv | - | |
| WZCSVC | rpcss | svchost1 |
| Dnscache | - | |
| LmHosts | - | |
| RemoteRegistry | rpcss | svchost1 |
| SSDPSRV | - | |
| WebClient | - | |
| Spooler | rpcss | svchost1 |
| ALG | - | |
| IISADMIN | rpcss, samss | svchost1, lsass |
| SMTPSVC | eventlog, iisadmin | services, inetinfo |
| W3SVC | iisadmin | inetinfo |
| MDM | rpcss | svchost1 |
| Mnmsrvc | - | |
| SCardSvr | plugplay | services |

FIG. 3B

FAILED LOG MESSAGE

Dependent "Netlogon" service of the "lsass" service hosting process is in an inconsistent state due to non-availablility of the "svchost2" service hosting process hosting the "Lanmanworkstation" provider service.

FIG. 5A

SUCCESS LOG MESSAGE

Dependent "Netlogon" service of the "lsass" service hosting process has been recovered from an inconsistent state by restarting the lost "svchost2" service hosting process hosting the "Lanmanworkstation" provider service.

METHOD AND SYSTEM FOR MAINTAINING SERVICE DEPENDENCY RELATIONSHIPS IN A COMPUTER SYSTEM

FIELD OF THE INVENTION

The present invention relates generally to computer systems. More particularly, the present invention relates to a method and computer system for maintaining service dependency relationships in a computer system.

BACKGROUND OF THE INVENTION

In a computer system, such as a network or an operating system, there are multiple services available that service different requests in the system. In particular, a "service hosting process" is a process in the system that runs at least one provider service that may be depended upon by other services. For clarity, provider services refer to services that are hosted by the service hosting process, and dependency services refer to services that depend on the provider services. In other words, the dependency services cannot work unless their corresponding provider services have been initiated or started in the computer system. Since these dependency services depend upon these provider services, the current Windows® operating system is designed to start all the service hosting processes along with their provider service(s) at startup. However, there is no verification of whether these provider services have actually started or are actually available at production time. In practice, the provider services are expected to run all the time, even if they may sometimes fail to start or have been taken off-line due to, for example, either product bugs or an unstable interrelationship with third party software. For example, if a service hosting process that a dependency service depends upon is not available, either due to some fault or wrong settings, the dependency service generally would also malfunction, and the malfunction is often handled without proper error handling. Typically, the only way the problem is handled is to restart the operating system, which restarts all the processes and services. However, this made the system less available and reliable.

SUMMARY OF THE INVENTION

The service dependency and consistency checking system disclosed herein addresses the absence of service dependency relationships maintenance in a computer system.

In embodiments of the present invention, a reference file showing the linked dependency of predefined service components of the computer system and a dynamic service consistency file showing the linked dependency of currently available predefined service components of the computer system are included. A server control manager is also included to compare these two files to find any inconsistency between them, and to start any lost predefined service component(s) to correct the inconsistency found.

More particularly, the present invention is directed to a method and computer system for maintaining service dependency relationships between executable service components in a computer system that include a step of a dynamic service consistency file being read to indicate currently available predefined service components in the computer system tag. The dynamic service consistency file is compared to a reference file that includes dependency links of the predefined service components of the computer system. From the comparison of these files, it is then determined whether there is any inconsistency between the files that needs to be corrected. Any lost predefined service component(s) is/are started to correct such inconsistency.

Additional aspects of the invention are made apparent by the following detailed description of illustrative embodiments that proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 3A is an exemplary data structure of a table as a reference file including a list of installed service hosting processes and their corresponding provider services;

FIG. 3B is an exemplary data structure of a table as a reference file including dependency links between the provider services of the installed service hosting processes and the dependency services;

FIG. 5A is an exemplary log message of a lost installed service hosting process that failed to restart;

FIG. 5B is an exemplary log message of a lost installed service hosting process that successfully restarted;

DETAILED DESCRIPTION OF THE DRAWINGS

Figure 1:
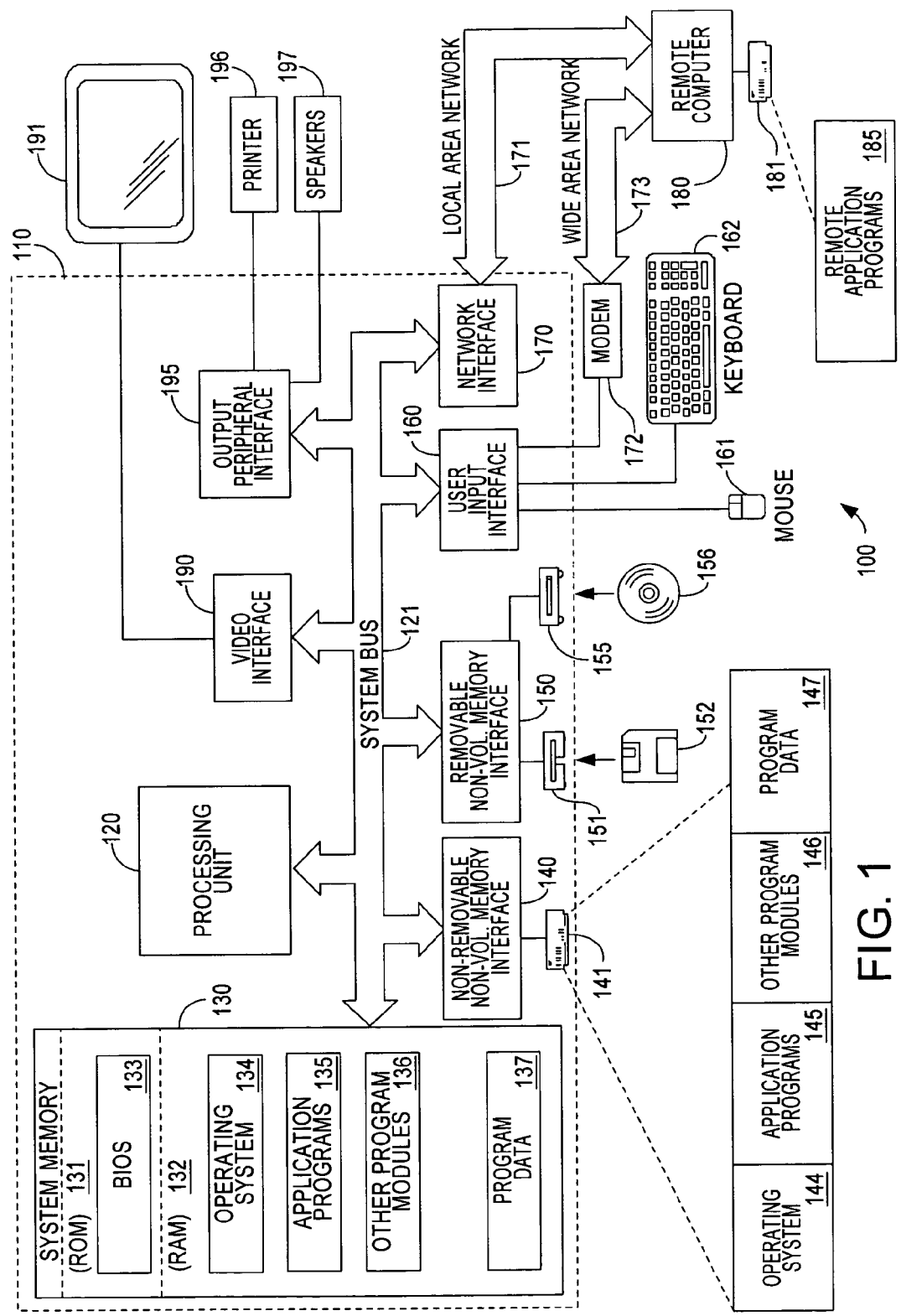
FIG. 1 is a block diagram depicting an exemplary computer system for carrying out an embodiment of the invention.

In embodiments of the present invention, a reference file with dependency links of predefined service components is included. A dynamic service consistency file with dependency links of currently available predefined service components in the computer system is then compared to the reference file. From the comparison, any inconsistencies between these files are determined. Any lost predefined service component(s) is/are started to correct these inconsistencies. As a result, the present invention provides a way to maintain service dependency relationships in a computer system.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device or electrical signals representing data in a structured form. This manipulation transforms the data or maintains them at locations in the memory system of the computing device, which reconfigures or otherwise alters the operation of the device in a manner well understood by those skilled in the art. The data structures, where data are maintained, are physical locations of the memory that have particular properties defined by the format of the data. However, while the invention is being described in the foregoing context, it is not meant to be limiting as those of skill in the art will appreciate that various acts and operations described hereinafter may also be implemented in hardware.

The present invention allows the user processes using kernel resources to be tracked. FIG. 1 illustratively depicts an example of a suitable operating environment 100 for carrying out tracking functionality of kernel resources in accordance with the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
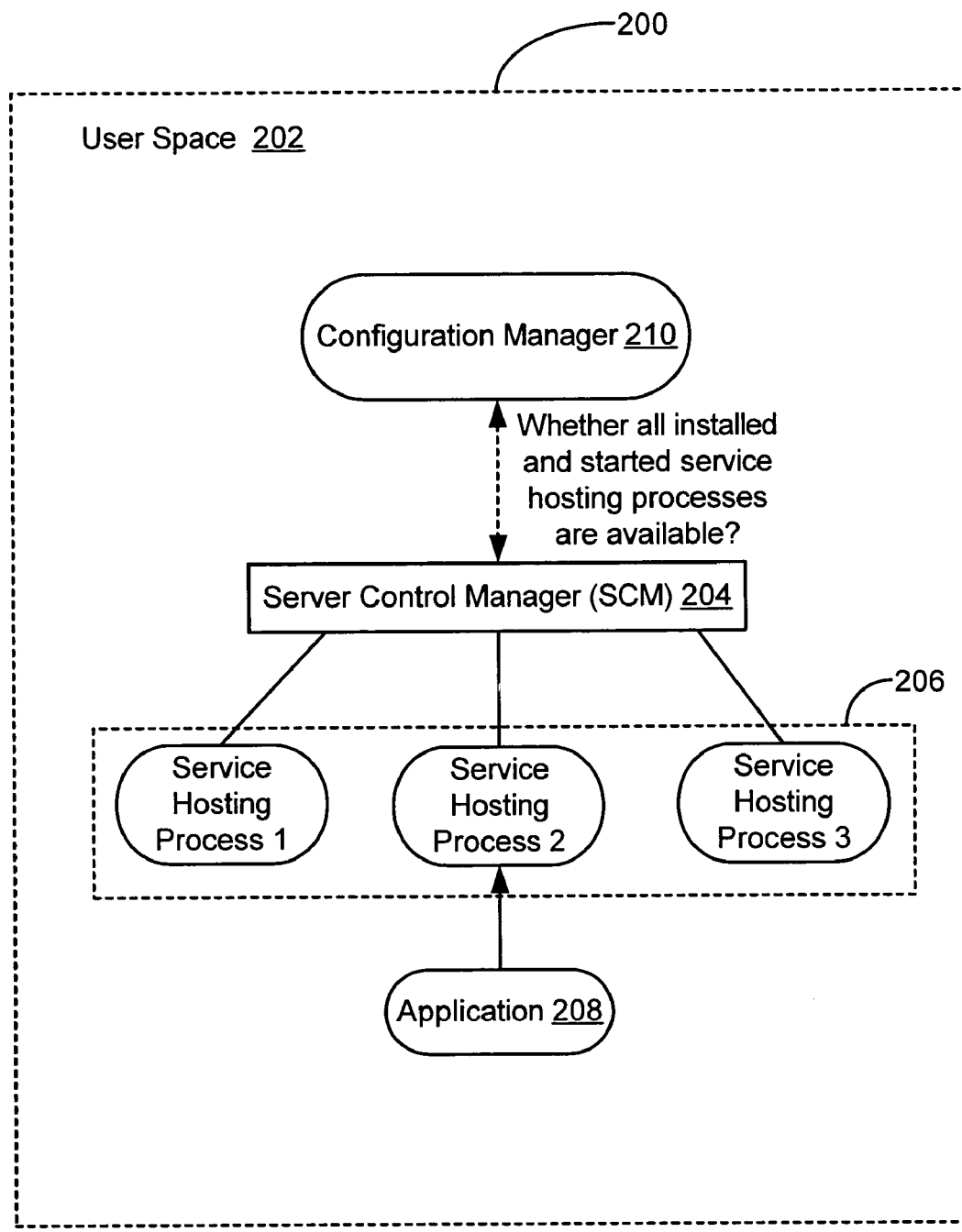
FIG. 2 is a high level schematic diagram depicting computer modules for carrying out an embodiment of the invention.

FIG. 2 illustratively depicts an exemplary system of computer modules, indicated generally at 200, for carrying out the present invention in a Windows® operating system environment. It should be noted that the present invention contemplates implementations with other computer operating systems, such as Unix, Linux, and MacOS®. Moreover, the present invention also can be implemented in a network system consisting of multiple computers providing various services. Although the Windows® operating system implementation is used as an example to describe the present invention, one skilled in the art would appreciate alternate embodiments with implementations in a network system and other operating systems.

Operating systems are typically divided into two levels of operations, specifically a user space 202 and a kernel space (not shown). Since the present invention relates to service hosting processes and provider services of a network or an operating system, the computer modules that are needed will generally reside in the user space 202. As an example, the current Windows® operating system includes a Service Control Manager ("SCM") 204 that starts, stops, and pauses the needed service hosting process 206, which may include any default or requested service hosting processes. In particular, requested processes are processes that are only started based on a request from a requesting source 208, such as an application, and default processes are processes that are started regardless of whether they are being used or requested. The default processes are typically started at the startup of the network system or the operating system. As an example, default processes generally include provider services that are depended upon by other services in the system. While the SCM 204 controls the functionality of the processes and manages generally the service configuration of these processes, a configuration manager 210 keeps track of whether the processes are actually currently available (e.g., active) in the system. Using the configuration manager 210, the present invention is able to determine the currently available or working processes in the system.

Moreover, since the SCM 204 already exists in the Windows® operating system as a control interface between processes and the system, it is preferably modified to implement the present invention. Specifically, the SMC 204 is extended to add the functionality of the present invention. It should be noted that this is one embodiment to implement the present invention. However, other embodiments, such as adding a separate manager with the functionality of the present invention or modifying an existing manager of a network system, are contemplated. For example, it may be more desirable to modify an existing manager of a server computer in a network environment to avoid modifying the client computers. Since there are various implementations to the present invention, the above-described computer module system 200 is exemplary. As those skilled in the art will readily appreciate, the present invention, enabling a programmer to maintain service dependency, can be incorporated into a variety of system components and modules. Thus, the present invention is not limited to any particular computer system or environment shown.

Turning to FIGS. 3A and 3B, a table of a reference file including a list of installed service hosting processes with their corresponding provider services, and dependency links between the provider services of the installed service hosting processes and the dependency services is respectively shown and indicated generally at 300 and 302. As an example, although the data structure of the reference file are shown as a table in FIGS. 3A and 3B, it should be noted that other data structures, such as a graph (shown in FIGS. 4A and 4B), a tree, linked lists, etc., can also be used, and one skilled in the art would readily appreciate these various data structures.

The reference file deals with installed service hosting processes, which refer to processes that are installed in the system, and are generally needed by applications in the system. The installed service hosting processes generally run all the time at the start of the system, and thus they are preferably checked in the present invention. For example, naming a few typical service hosting processes in the Windows® operating system environment, processes, such as "Lsass.exe," "Svchostl.exe," "services.exe," and "alg.exe," along with their provider services, are included in the tables shown. All the processes and provider services are kept in the Windows® registry. In particular, the installed service hosting processes along with their dependency links are gathered from "HKEY_LOCAL_MACHINE\SYSTEM\CurrentControl Set\Services\<service name>\DependOnService" of the registry. Another rule for constructing the reference file is based on the start order of the services, which again can be obtained from the registry. Using the start order, if service B starts after service A, it is assumed that service B is dependent upon service A. As a result, in this example, there would be a directed arc from service A to service B. There are various implementations of linking the dependency of the services in the reference file, which can be readily appreciated by one skilled in the art.

However, it should be noted that instead of using the installed service hosting processes indicated by the Windows® registry, a predefined list of processes or services can be implemented with the present invention. For example, instead of checking all the installed processes, a selective list of processes or services can be predefined. The predefined list may be preferred, especially when the present invention is implemented with a network system. Another predefined list may include only the default processes or services, and not include the requested processes or services. These various implementations of a customized list of processes or services are readily appreciated by one skilled in the art according to the needs and designs of specific implementations. Thus, the embodiment shown is not limited to the implementation of the Windows® operating system.

FIG. 3A shows the installed service hosting processes indicated by the Windows® registry along with their corresponding provider services. In particular, the first column includes a list of the installed service hosting processes, and the second column includes the provider service(s) hosted by each process. For example, the "services.exe" service hosting process runs or hosts the provider services of "Eventlog" and "Plug-Play." On the other hand, FIG. 3B shows a list of services in the first column, and the second column includes the provider service(s) that are depended upon by each service in the first column. The third and last column is the service hosting process of each provider service(s) in the second column. For example, the "Eventlog" service, which is a provider service of the "services.exe" service hosting process (shown in FIG. 3A), does not depend on any other services. In contrast, the "Netlogon" service, which is a provider service of the "lsass.exe" service hosting process (shown in FIG. 3A), depends on the "lanmanworkstation" provider service of the "svchost2" service hosting process. Thus, as shown, a service can be both a provider service and/or a dependency service. The information provided by the tables shown in FIGS. 3A and 3B can then be used to generate the reference file shown in FIG. 4A, and the tables can be used to identify the dependency relationships in the computer system.

Figure 4A:
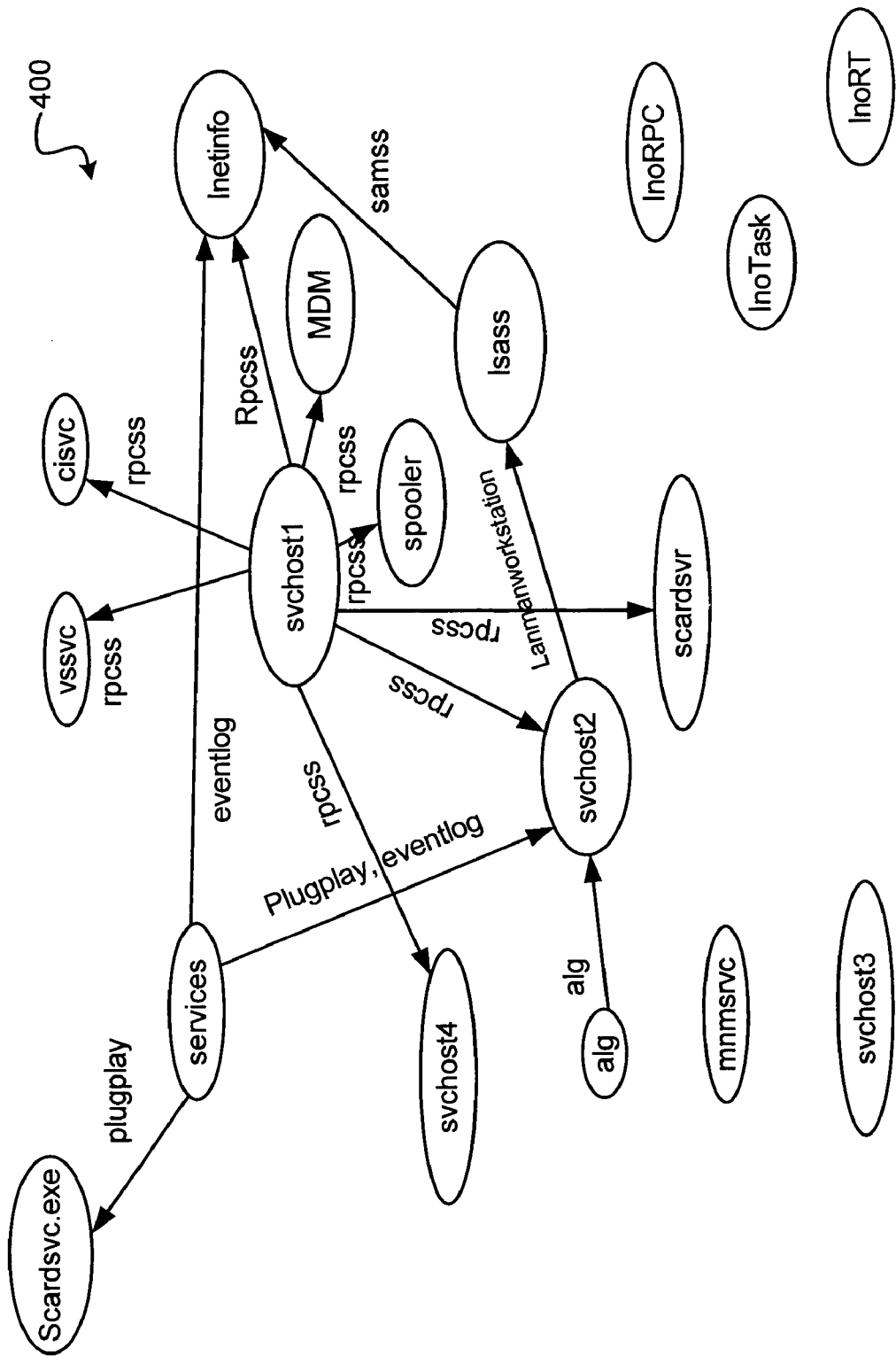
FIG. 4A is an exemplary data structure of a graph as a reference file including dependency links between the installed service hosting processes.

Using the information provided in these tables, the graph shown in FIG. 4A and indicated generally at 400 includes the dependency links between the installed service hosting processes. Specifically, a dependency link, for example, between the "svchost2" process and the "lsass" process can be determined. As shown in the reference file of FIG. 4A, a directed arc of a provider service "Lanmanworkstation" is linked from the "svchost2" process to the "lsass" process. In this case, at least one dependency service from the "lsass" process, specifically the "Netlogon" service (shown in FIG. 3B), depends upon the "Lanmanworkstation" provider service hosted by the "svchost2" process. In other words, in order for a service of the "lsass" process to function, the "svchost2" process must first be initialized. Since "svchost2" is a service hosting process with a provider service that is depended upon by other services, it is generally executed at the startup of the Windows® operating system as a default service. Basically, the reference file includes the installed service hosting processes of the system, and it is a reference indicating the overall typology of the service hosting processes in the system. The reference file can either be automatically generated at startup by using the registry information or manually generated by a network administrator. It should be noted that the reference file does not change unless there is a change in the installed service hosting processes in the system.

Figure 4B:
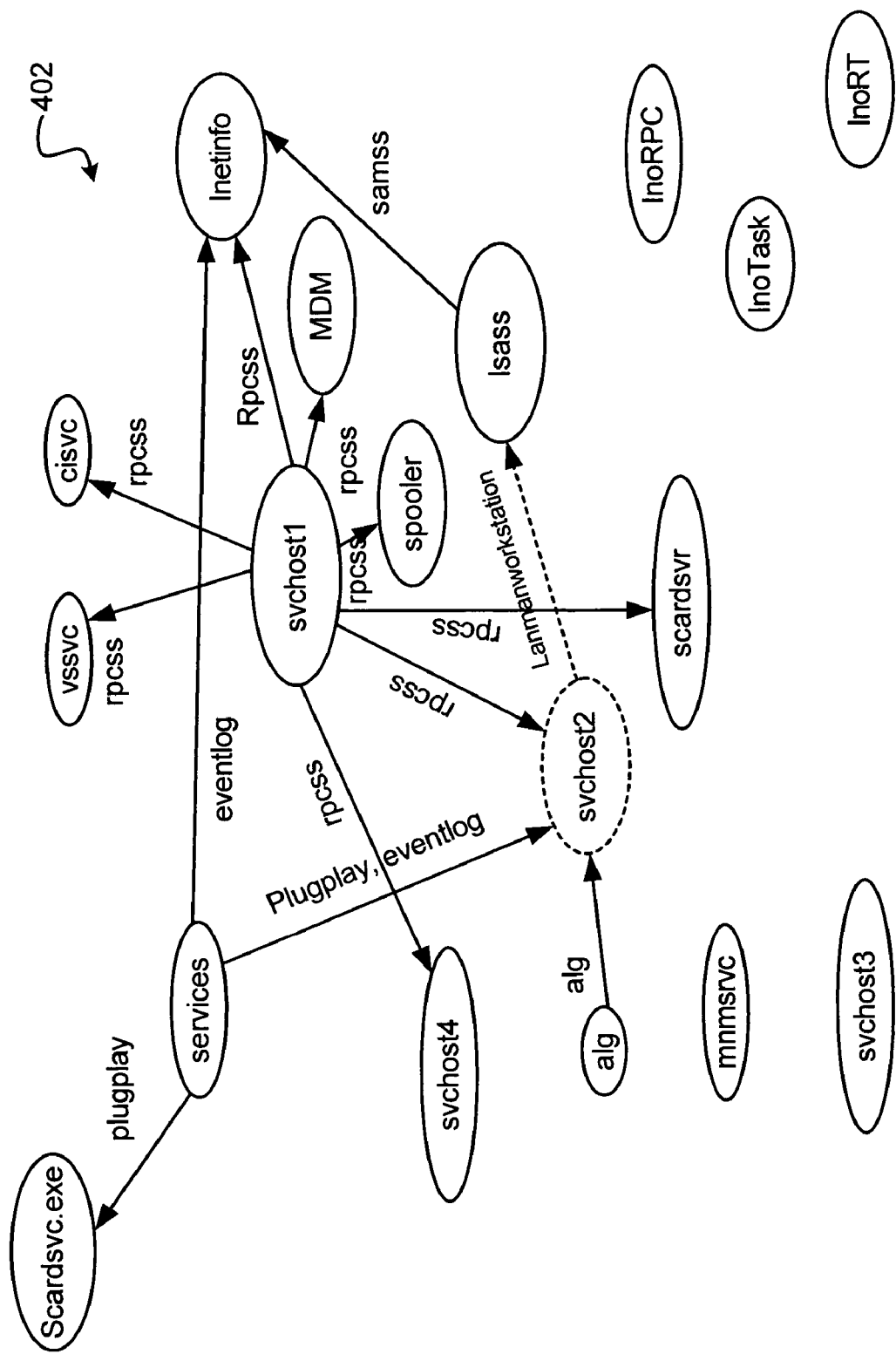
FIG. 4B is an exemplary data structure of a graph as a dynamic service consistency file including dependency links between currently available service hosting processes.

On the other hand, the dynamic service consistency file shown in FIG. 4B, which includes dependency links between currently available service hosting processes, is dynamic. Preferably, the dynamic service consistency file is generated at the startup of the system. Only the currently available or active service hosting processes are included. In particular, the installed service hosting processes are preferably initialized at startup, and the system can then be checked to determine whether the initialized installed service hosting processes have actually started. In the Windows® operating system environment, the status of the processes can be easily obtained by using the "tasklist/svc" command. The dynamic service consistency file can then be generated based on the status of the processes.

As an example, the node of the "svchost2" process along with the provider service that is depended upon by other services are shown with dotted lines in FIG. 4B to reflect that the node of the "svchost2" process is inactive, even after the initialization of the system. This failure may be caused by failed software or hardware in the system. Since the "svchost2" process is inactive in the system, the provider service "Lanmanworkstation" that other service(s) depend(s) upon is also inactive. Comparing the reference file 400 shown in FIG. 4A to the dynamic service consistency file 402 shown in FIG. 4B, these two files are inconsistent, since the "svchost2" process and the provider service "Lanmanworkstation" are not active. From this determination, the system will try to first restart the "svchost2" process, which in turn would start the provider service "Lanmanworkstation". Once the "svchost2" process is started, the dependency service(s) can now function as well. In this case, the dependency service "Netlogon" service of the "lsass" process can again function with the restart of the "Lanmanworkstation" service. As shown, since the dynamic service consistency file changes whenever there is a new service status, it is dynamic.

As noted, an attempt to restart the lost process will be initiated, and preferably in one embodiment of the present invention, a log message is generated to reflect the status of the lost process. FIGS. 5A and 5B show a failed log message and a success log message, respectively, which are indicated generally at 500 and 502. According to our example shown in FIG. 4B, if the "svchost2" process cannot be successfully restarted, an exemplary failed log message shown in FIG. 5A is generated and saved in the system. Specifically, the failed log message would generally report that the dependency service (e.g., Netlogon) of the service hosting process (e.g., lsass) malfunctioned due to the service hosting process (e.g., svchost2) hosting the provider service (e.g., Lanmanworkstation") being not available. If, however, the "svchost2" process is successfully restarted, an exemplary success log message shown in FIG. 5B is generated and saved in the system instead. As shown, the success log message reports that the dependent "Netlogon" service of the "lsass" process has been recovered by restarting the lost "svchost2" process hosting the "Lanmanworkstation" provider service. Using the log messages, valuable information relating to the dependency relationships in the computer system is reported and logged.

Figure 6:
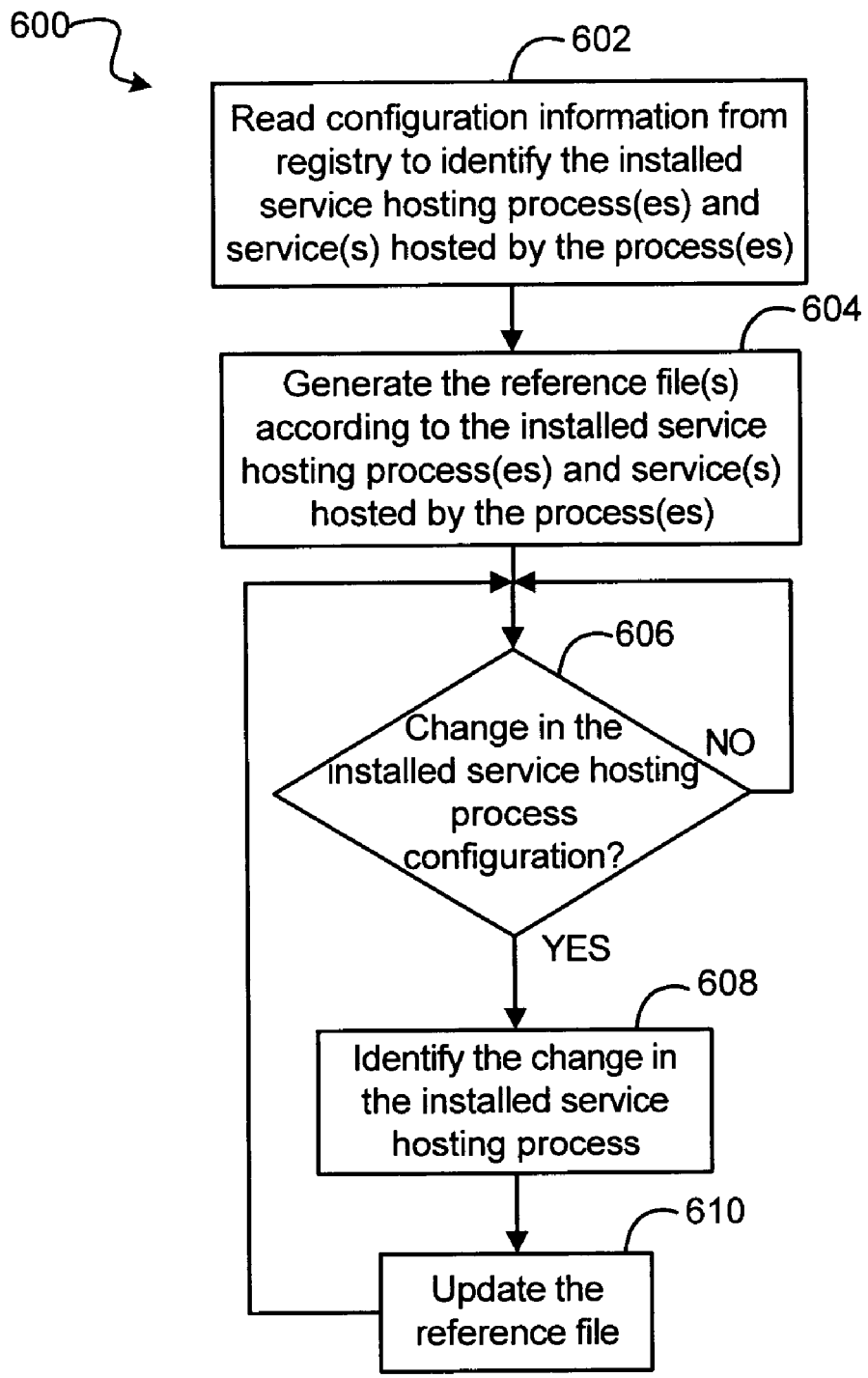
FIG. 6 is a flowchart summarizing a set of steps for generating the reference file(s) according to one embodiment of the present invention.

FIG. 6 shows a flowchart summarizing a set of steps for generating the reference file(s), which is indicated generally at 600. The steps summarized herein below represent an exemplary implementation with the Windows® operating system. Moreover, as indicated, the "Server Control Manger" 204 is modified to perform the steps summarized in the flow chart. However, the steps shown can be modified and altered for other various implementations representing alternative embodiments of the invention, and one skilled in the art would appreciate these alternative methods in view of the disclosure contained herein.

At step 602, the method first reads the configuration information from the registry to identify the installed service hosting process(es) and the provider service(s) hosted by these process(es). In the Windows® operating system implementation, the Windows® registry would be read to determine the configuration information of the operating system. After the information has been gathered at step 602, the reference file(s) relating to these installed service hosting process(es) and their corresponding provider services is/are generated at step 604. Since there are multiple processes running in a Windows® operating system environment, multiple reference files would likely be generated. Thus, in the exemplary Windows® implementations, the tables shown in FIGS. 3A and 3B and the graph shown in FIG. 4A are generated according to the installed service hosting process and their corresponding provider services at this step.

A set of the reference files can be created manually by a programmer at the time of implementation of the present invention. Another alternative implementation is to automatically create or revise these reference files whenever the installed service hosting processes have been changed or at each startup of the system. These automated functionalities can be implemented by extending the SCM 204 or adding another application to the system. As shown, there are multiple ways to create these reference files, and these various implementations are readily appreciated by one skilled in the art. In the present embodiment, the method at step 606 periodically determines whether there is a change in the installed service hosting process configuration. Step 606 can be implemented with a timeout that periodically checks for a change, or alternatively, step 606 can be initiated by an action in the system that changes the registry or the installed service hosting processes. If there is no change at step 606, the method reloops to keep checking for a change or waits until a change is detected. If, however, there is a change in the installed service hosting process configuration at step 606, the change is identified at step 608. The reference file will accordingly be updated at step 610, and the process loops to step 606 to continually wait for or detect a change in the installed service hosting process configuration.

Figure 7:
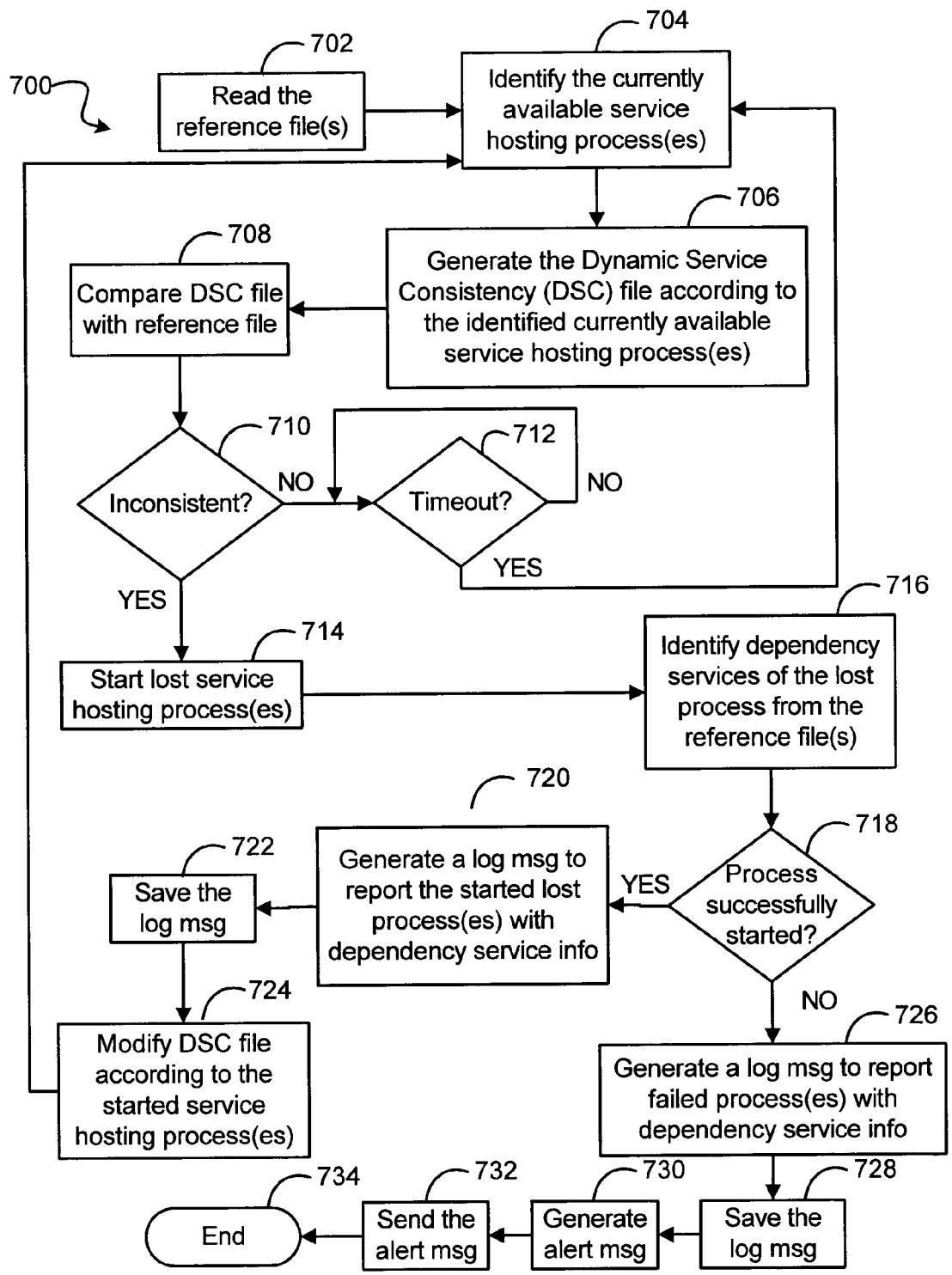
FIG. 7 is a flowchart summarizing a set of steps for maintaining service dependency according to one embodiment of the present invention.

Turning now to FIG. 7, a flowchart summarizing a set of steps for maintaining the service dependency according to an embodiment of the present invention is shown and indicated generally at 700. The steps summarized herein below again represent an exemplary implementation with the Windows® operating system. The "Server Control Manger" 204 can be similarly modified to perform the steps summarized in this flow chart. However, the steps shown can be modified and altered for other various implementations representing alternative embodiments of the invention, and one skilled in the art would appreciate these alternative methods in view of the disclosure contained herein.

The method first starts by reading the reference file(s) at step 702. From the reference file(s), step 704 identifies the currently available service hosting process(es), and the dynamic service consistency file(s) according to the identified currently available service hosting process(es) is/are generated at step 706. In the present implementation shown, a dynamic service consistency file in the form of a graph shown in FIG. 4B would be generated. As readily appreciated by one skilled in the art, other forms of the dynamic service consistency file can be used, but preferably the format of the dynamic service consistency file is the same as the reference that being compared. Moreover, a set of dynamic service consistency files is preferably created at the startup of the system, as a way to keep track of the processes that are currently available at the start of the system. After a set of the dynamic service consistency files is created, these files are revised when triggered by a change of status in the processes, such as a failure error or a status change in the currently available processes. For example, a process may have stopped or crashed in an unexpected manner or may have started after correcting an inconsistency between the reference files and the dynamic service consistency files. It is also preferred that the number of reference files that are to be compared be the same as the number of dynamic service consistency files at startup, but other implementations, such as creating the dynamic service consistency files on an as-needed basis, can also be configured, depending on the system.

Once the dynamic service consistency file(s) is/are generated, each dynamic service consistency file is compared to its corresponding reference file at step 708 to determine whether there is any inconsistency between the two files. If there is no inconsistency between the two files at step 710, which generally means the system is functioning properly, the method waits for a timeout at step 712. If the method has not been timed out at step 712, the method remains waiting until there is a timeout. Once the timeout has passed in step 712, the method reloops to identify the currently available service hosting process(es) at step 704. In this way, the method can continually keep checking whether the process(es) is/are actually started or available.

However, if any inconsistencies, which indicate lost process(es) in the system, are found between the two files at step 710, the lost process(es) is/are accordingly initiated to correct the inconsistencies between the files at step 714. Inconsistency is found when, for example, a continuous running installed service hosting process, which is indicated as such in the reference file, is missing from the dynamic service consistency file. The missing process indicates that the process is currently not available, and as a result, an inconsistency is found between the reference file and the dynamic service consistency file. Accordingly, the missing process will be started to correct the inconsistency at step 714. Although in the present embodiment shown, the missing process is started automatically, a policy to implement other courses of action can also be used. For example, a network administrator may decide that some processes should not be started, and instead a log message should be sent immediately. These other various implementations are readily appreciated by one skilled in the art.

Moreover, the method continues at step 716 by identifying the dependency services of the lost process(es) from the reference file, specifically from the tables shown in FIGS. 3A and 3B. Step 718 then determines whether the lost process has been successfully started. If so, step 720 generates a log message, such as the success log message shown in FIG. 5B, to report the started lost process(es) including the dependency service information, which is saved in step 722. The dynamic service consistency file will accordingly be modified at step 724 to reflect the missing process once it has been started.

If, on the other hand, the lost process cannot be successfully started at step 718, step 726 generates another log message, such as the failed log message shown in FIG. 5A, to report the failed process(es) including the dependency service information. The log message is saved at step 728. Moreover, an alert message is preferably generated at 730 to report that the lost service cannot be restarted, and the alert message is sent to an interested user, such as a network administrator, at step 732. The method will then be terminated at step 734.

It will be appreciated by those skilled in the art that a new and useful method and system has been described for maintaining service dependency in a computer system. In view of the many possible environments in which the principles of this invention may be applied and the flexibility of designing and carrying out software utilities and tools, it should be recognized that the embodiments described herein are meant to be illustrative and should not be taken as limiting the scope of the invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for maintaining service dependency relationships between executable predefined service components of an operating system of a computer comprising the steps of:
   maintaining a dynamic service consistency file in the operating system containing entries to identify predefined service components that are currently available in the operating system of the computer, wherein:
      the currently available predefined service component entries are linked according to their dependency, the dynamic service consistency file comprising a first representation in any one from the group of a tree, a graph, a linked list, or a table; and
      the linking for each currently available predefined service component entry indicates a first currently available service component from which each currently available predefined service component depends, and the linking indicates a second currently available service component that depends on the each currently available predefined service component, the each currently available predefined service component corresponding to the each currently available predefined service component entry;
   comparing the dynamic service consistency file to a reference file in the operating system containing entries to identify the predefined service components of the operating system of the computer, wherein:
      the predefined service component entries are linked in the reference file according to their dependency, the reference file comprising a second representation in any one from the group of a tree, a graph, a linked list, or a table; and
      the linking for each predefined service component entry in the reference file indicates a first predefined reference service component from which each predefined service component depends, and the linking indicates a second predefined reference service component that depends on the each predefined service component, the each predefined service component corresponding to the each predefined service component entry;
   determining whether an inconsistency exists between service component entries within the dynamic service consistency file and the reference file; and
   starting any lost predefined service component to correct any inconsistency based upon the determining step.

2. The method of claim 1 further comprising the steps of:
   modifying the dynamic service consistency file based upon the starting step; and
   repeating from the maintaining step.

3. The method of claim 2 further comprising the steps of:
   reading the reference file;
   identifying the dependency services of the lost predefined service component according to the reference file; and
   generating a log message to report the lost predefined service component including the identified dependency service components based upon the identifying the dependency services of the lost predefined service component step.

4. The method of claim 3 further comprising the step of saving the log message.

5. The method of claim 4 further comprising the steps of:
   determining whether the lost predefined service component has been successfully started; and
   generating the log message to report the lost predefined service component according to the determination step, wherein the log message includes dependency service information of the lost predefined service component.

6. The method of claim 5 further comprising the steps of:
   generating an alert message to report the lost predefined service according to the determination step; and
   sending the alert message to a user.

7. The method of claim 6 wherein the maintaining step further comprises the steps of:
   identifying the currently available predefined service components; and
   generating the dynamic service consistency file based upon the identifying the currently available predefined service components step.

8. The method of claim 7 wherein the maintaining step further comprises the steps of:
   determining whether a timeout has occurred; and
   repeating the identifying the currently available predefined service components step when a timeout has occurred based upon the determining whether a timeout has occurred step.

9. The method of claim 8 wherein inconsistency is based on at least one missing predefined service component in the dynamic service consistency file when compared to the reference file.

10. The method of claim 9 wherein the service components include any one from the group of a process, a service hosting process, a service, a provider service, and a dependency service.

11. The method of claim 10 wherein the predefined service components are installed service hosting processes or provider services that are depended upon by other services.

12. A computer system for maintaining service dependency relationships between executable service components in an operating system of the computer system, comprising:
   a computer-readable storage medium having computer-executable instructions for providing:
      a reference file in the operating system containing entries to identify installed service components of the operating system of the computer system, wherein:
         the installed service component entries are linked according to their dependency, the reference file comprising a second representation in any one from the group of a tree, a graph, a linked list, or a table; and
         the linking for at least one installed service component entry indicates a first installed service component from which at least one installed service component depends, and the linking indicates a second installed service component that depends on the at least one installed service component, the at least one installed service component corresponding to the at least one installed service component entry;

a dynamic service consistency file in the operating system containing entries to identify currently available service components in the operating system of the computer system, wherein:

the currently available service component entries are linked according to their dependency, the dynamic service consistency file comprising a first representation in any one from the group of a tree, a graph, a linked list, or a table; and the linking for at least one currently available service component entry indicates a first currently available service component from which at least one currently available service component depends, and the linking indicates a second currently available service component that depends on the at least one currently available service component, the at least one currently available service component corresponding to the at least one currently available service component entry; and a server control manager for comparing the dynamic service consistency file to the reference file to identify any inconsistency between the files, and starting any lost service component to correct any identified inconsistency.

13. A computer-readable storage medium having computer-executable instructions for performing steps comprising:

maintaining a dynamic service consistency file in an operating system of a computer containing entries to identify predefined service components that are currently available in the operating system, wherein:

the currently available predefined service component entries are linked according to their dependency, the dynamic service consistency file comprising a first representation in any one from the group of a tree, a graph, a linked list, or a table; and the linking for at least one currently available predefined service component entry indicates a first currently available predefined service component from which at least one currently available predefined service component depends, and the linking indicates a second currently available predefined service component that depends on the at least one currently available predefined service component, the at least one currently available predefined service component corresponding to the at least one currently available predefined service component entry;

comparing the dynamic service consistency file to a reference file in the operating system containing entries to identify the predefined service components of the operating system of the computer, wherein:

the predefined service component entries are linked in the reference file according to their dependency, the reference file comprising a second representation in any one from the group of a tree, a graph, a linked list, or a table; and the linking for at least one predefined service component entry in the reference file indicates a first predefined reference service component from which at least one predefined service component depends, and the linking indicates a second predefined reference service component that depends on the at least one predefined service component, the at least one predefined service component corresponding to the at least one predefined service component entry;

determining whether an inconsistency exists between service component entries within the dynamic service consistency file and the reference file; and starting any lost predefined service component to correct any inconsistency based upon the determining step.

* * * * *

UNITED STATES PATENT AND TRADEMARK OFFICE
CERTIFICATE OF CORRECTION

PATENT NO.      : 7,603,442 B2                                          Page 1 of 1
APPLICATION NO. : 10/600394
DATED           : October 13, 2009
INVENTOR(S)     : Ranjan K. Sen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1313 days.

Signed and Sealed this

Fifth Day of October, 2010

David J. Kappos
*Director of the United States Patent and Trademark Office*